(12) United States Patent
Wells et al.

(10) Patent No.: US 8,774,344 B1
(45) Date of Patent: Jul. 8, 2014

(54) TRI-ISOTROPIC (TRISO) BASED LIGHT WATER REACTOR FUEL

(75) Inventors: Alan H. Wells, Duluth, GA (US); Laurence Danese, Atlanta, GA (US)

(73) Assignee: Neucon Technology, LLC, Atlanta, GA (US)

( * ) Notice: Subject to any disclaimer, the term of this patent is extended or adjusted under 35 U.S.C. 154(b) by 0 days.

(21) Appl. No.: 13/347,923

(22) Filed: Jan. 11, 2012

Related U.S. Application Data

(60) Provisional application No. 61/441,640, filed on Feb. 10, 2011.

(51) Int. Cl.
*G21C 3/00* (2006.01)
*G21C 3/62* (2006.01)
*C09K 11/04* (2006.01)

(52) U.S. Cl.
CPC .............. *G21C 3/626* (2013.01); *G21Y 2004/10* (2013.01)
USPC ............ 376/411; 376/409; 376/419; 252/636

(58) Field of Classification Search
USPC ........................... 376/409, 411, 419; 252/636
See application file for complete search history.

(56) References Cited

U.S. PATENT DOCUMENTS

| | | | |
|---|---|---|---|
| 3,883,623 A * | 5/1975 | Lay ............................... | 264/0.5 |
| 3,992,258 A | 11/1976 | Tobin | |
| 4,010,287 A | 3/1977 | Beatty | |
| 4,077,838 A | 3/1978 | Lindemor et al. | |
| 4,113,563 A | 9/1978 | Tobin | |
| 4,227,081 A | 10/1980 | Caputo et al. | |
| 4,267,019 A | 5/1981 | Kaae et al. | |
| 4,591,478 A | 5/1986 | Cohen et al. | |
| 5,094,804 A | 3/1992 | Schweitzer | |
| 5,242,631 A | 9/1993 | Iyer et al. | |
| 5,251,244 A | 10/1993 | Wazybok et al. | |
| 5,500,158 A | 3/1996 | Komada et al. | |
| 5,583,897 A | 12/1996 | Hill | |
| 5,596,615 A | 1/1997 | Nakamura et al. | |
| 5,762,838 A | 6/1998 | Ohmuta et al. | |

(Continued)

FOREIGN PATENT DOCUMENTS

EP          532858 A1  *  3/1993

OTHER PUBLICATIONS

"Advanced fuel pellet materials and designs for water cooled reactors", IAEA-TECDOC-1416, Proceedings of a technical committee meeting held in Brussels, Oct. 20-24, 2003.*

*Primary Examiner* — Frank J McGue
(74) *Attorney, Agent, or Firm* — Rodgers & Rodgers

(57) ABSTRACT

The invention relates to a new and unique light water reactor (LWR) nuclear fuel pellet configuration formed using triisotropic (TRISO) fuel particles suspended in a metal, metal alloy, or ceramic matrix. The new TRISO LWR pellet would have the same dimensions as those of the standard uranium oxide pellet allowing its use without any change to the physical configuration of the reactor vessel, core internals or fuel assemblies. TRISO type fuels have a proven capability for retaining fission products within the confinement boundary created by the coating material. This robustness is expected to reduce or eliminate fuel failure risk and cost. Replacing standard pellets with TRISO LWR fuel pellets with the same, or higher, energy density can potentially extend the operating cycles of LWRs, reduce the number of fuel assemblies replaced in each refueling, reduce the quantity of spent fuel discharged from reactors, lower operating costs, and reduce radioactive waste.

3 Claims, 2 Drawing Sheets

Typical $d$ = 0.32"   Typical $d$ = 0.39"
PWR $l$ = 0.30"   BWR $l$ = 0.35"

(56) References Cited

U.S. PATENT DOCUMENTS

| | | |
|---|---|---|
| 5,805,657 A | 9/1998 | Heubeck |
| 5,916,497 A | 6/1999 | Bromley |
| 5,991,354 A | 11/1999 | Van Swam |
| 6,002,735 A | 12/1999 | Van Swam |
| 6,190,725 B1 | 2/2001 | Lee et al. |
| 6,808,656 B2 | 10/2004 | Gradel et al. |
| 7,403,585 B2 | 7/2008 | Ougouag et al. |
| 7,485,246 B2 | 2/2009 | Rhee et al. |
| 7,589,280 B2 | 9/2009 | Nelson |
| 7,666,463 B1 | 2/2010 | Youchison et al. |
| 2004/0052326 A1* | 3/2004 | Blanpain et al. ............ 376/411 |
| 2006/0039524 A1* | 2/2006 | Feinroth et al. ............ 376/409 |
| 2008/0144762 A1* | 6/2008 | Holden et al. ............ 376/416 |
| 2010/0290578 A1* | 11/2010 | Farrell et al. ............ 376/361 |
| 2011/0317794 A1* | 12/2011 | Venneri et al. ............ 376/170 |

* cited by examiner

TRI-ISOTROPIC (TRISO) BASED LIGHT
WATER REACTOR FUEL

The benefits under 35 U.S.C. 119 are claimed of provisional patent application 61/441,640 filed Feb. 10, 2011.

BACKGROUND OF THE INVENTION

This invention relates to combining two well-known and proven technologies in a new and unique way to achieve reduced risk to the public by significantly improving the containment of nuclear fission products from accident events in which fuel integrity is compromised; and, by increasing reactor full power days through increased fuel enrichment. These technologies are tri-isotropic (TRISO) fuel, used in high temperature gas-cooled reactors and zircaloy fuel tubes, used in fuel assemblies for light water reactors.

The invention describes a new and unique light water reactor (LWR) nuclear fuel pellet configuration formed using tri-isotropic (TRISO) fuel particles uniformly distributed in a non-fuel bearing metal, metal alloy or ceramic matrix. This new TRISO LWR fuel pellet would replace the uranium oxide pellet in the LWR fuel tube in the fuel assemblies currently used in nuclear power plants. Use of the TRISO LWR fuel pellet would potentially extend the operating cycles of LWRs, reduce the number of fuel assembles replaced in each refueling, reduce the quantity of spent fuel discharged from each reactor, lower operating costs, reduce radioactive waste and reduce or eliminate fuel failure risk and cost. The TRISO fuel and the LWR cladding provide two separate, very robust, barriers against the release of radioactive material to the public thereby reducing the radiological risk in the event of a reactor accident and enhancing public safety.

The TRISO fuel particle has a long history of use in high temperature gas-cooled reactors applications, but is uniquely used in this invention. The particle is a multilayer sphere having layers of protecting material surrounding a central kernel of enriched uranium. The kernel is typically uranium oxide or uranium carbide, having enrichment in $U^{235}$ that varies depending on the intended use. The kernel is surrounded by layers of carbon, pyrocarbon and silicon carbide. These layers provide a level of structural integrity that has been demonstrated to contain fission products within the particle, precluding release in normal operations and most accident events. By incorporating the TRISO LWR fuel pellet in the LWR fuel rod, a second, and substantial, barrier is formed to preclude the release of fission product material.

To be used in LWR power plants, the TRISO fuel particles must be held in a metal, metal alloy or ceramic matrix that is non-fuel bearing and that has the same external dimensions as the LWR uranium oxide fuel pellet that it would replace. This allows the TRISO LWR fuel pellets to be substituted for the LWR fuel pellets. Once formed, the TRISO LWR fuel pellets are stacked within the zircaloy fuel rods and the fuel rods are combined into assemblies common to LWR power plants.

Suitable materials for the matrix can include stable, heat conducting materials such as zirconium, aluminum, zinc or nickel, and their alloys, or graphite or other ceramic that is compatible with the TRISO particle.

Use of the same LWR fuel rod and fuel assembly configurations allow use of the new TRISO LWR fuel in operating plants without any change to the physical configuration of the reactor vessel or core internals. Consequently, the use of this invention does not anticipate any changes to the current designs of LWR fuel rods or fuel assemblies. Varying inside diameters of the range of LWR fuel rods in current use are accommodated by conforming the diameter of the TRISO LWR fuel pellet to the inside diameter of the LWR fuel rod.

Numerous references apply to the design, fabrication and use of TRISO fuel microspheres. TRISO fuel has a history dating back to the 1970's when it was first considered for use in advanced design reactors including the high temperature gas cooled reactor. References can also be found for the use of TRISO fuel in pebble bed reactors. This invention uses the same TRISO fuel as an element of the TRISO LWR fuel pellet's unique design, but would not require revision, modification or change to any fabrication strategy, except as it may apply to enrichment.

Similarly, numerous references apply to LWR fuel pellet design, fabrication and use. The intent of this invention is to apply dimensions of existing LWR fuel pellet designs to the new fuel pellet. The new TRISO-LWR pellet is markedly different in all other respects from the existing LWR fuel pellets currently in use.

BRIEF SUMMARY OF THE INVENTION

The invention is comprised of multiple TRISO LWR fuel pellets held within a LWR fuel rod for use in a nuclear reactor for electric power generation. The TRISO LWR fuel pellet is formed by a large number of tri-isotropic microspheres (TRISO particles) held within a metal, metal alloy or ceramic matrix to form a pellet having the typical dimensions shown in FIG. 1, where such dimensions are variable depending on the design of the LWR fuel rod. The matrix material provides a stabilized, heat transfer medium that holds the TRISO particles in position once pellet fabrication is complete. The TRISO particles have a variable enrichment that is 3 to 5 times greater than the typical enrichment of LWR fuel pellets. LWR fuel rods containing TRISO LWR fuel pellets are arranged in a square array to form a LWR fuel assembly. Since the TRISO LWR fuel pellet is designed to be substituted for the LWR fuel pellets the fuel rod is designed to hold, no change to the design of LWR fuel rods or fuel assemblies is required. Because of the robustness of the TRISO microsphere design it has significant resistance to fuel failure that typically results in the release of fission material and gases to the environment. Since the TRISO LWR fuel pellet is within the LWR fuel tube cladding, a second substantial barrier is in place to retain fission products in the unlikely event that the TRISO microsphere surface coating should fail. These features have significant public safety benefit. Equally important is the ability to use higher enrichments within the TRISO microsphere. Using a higher enrichment than is typically available in LWR uranium oxide pellets potentially would allow the reactor operator to significantly increase the number of reactor full power days.

This invention relates to combining two well-known and proven technologies in a new and unique way to address two issues that are of concern in the production of power in LWR power plants. Those concerns are the release of fission product material to the environment in both accident and "leak" events and the desire to increase the time between reactor refueling by increasing allowable burnup of the nuclear fuel, while reducing the fuel leakage rate. Extending the allowable burnup in LWR fuels has been stymied by the failure of the fuel rod cladding at high burnup, which exposes the fuel pellets within the cladding (typically zircaloy) to reactor cooling water. Exposure of the fuel pellets (typically sintered uranium dioxide enriched to 5%) results in fission products being introduced in the water and subsequently dispersed throughout the reactor primary system. This release affects water chemistry within the reactor and threatens further dispersal through leaks to the secondary cooling system.

To accomplish these operational and safety improvements, the invention combines the TRISO fuel particle used in high temperature gas-cooled reactors and zircaloy fuel tubes, used in fuel assemblies for light water reactors.

TRISO (Tri-Isotropic) microsphere-type fuel has been under development for 50 years as a fuel for advanced reactor designs, including the high temperature gas cooled reactor and various "pebble bed" reactor configurations. These initiatives have also been part of the Department of Energy's Next Generation Nuclear Plant project.

The TRISO fuel is formed by surrounding a kernel of enriched uranium dioxide or uranium carbide with coatings of carbon and silicon carbide. These coatings are applied in layers to achieve a composite microsphere typically one (1) mm in diameter. An outer coating of zirconium may also be provided. The finished coating is a durable shell that can hold within it the fission products, including gas generation, that occur during use in the reactor. Based on the ability of the coating to retain fission products, the TRISO type fuel has been shown to extend the burnup of fuel by a factor of two in High Temperature Gas Reactors. The increased burnup allows the reactor to operate longer between required refuelings. The low failure rate works to reduce the amount of fuel material and contamination that is available for "redistribution" around the reactor cooling system.

This invention takes advantage of the containment feature of the TRISO fuel, and the ability to establish the desired enrichment of the uranium kernel, to improve the burnup performance of existing LWR power plants. This is accomplished by mixing the TRISO fuel, with the desired enrichment with a material that forms a heat conducting matrix to support the enriched fuel.

The matrix would be formed using any heat conducting stable material including metal, metal alloys or ceramic. Metals, and alloys thereof, could include such materials as zirconium, aluminum, zinc or nickel or alloys of these metals. The matrix could also be formed from a ceramic such as graphite. The mixing of the TRISO fuel and the stabilizing media is controlled such that the density of the fuel in each pellet thus formed is only about one-half (½) of that found in the standard uranium dioxide ($UO_2$) fuel pellet used in existing LWR plants. Density is decreased because the increase in enrichment could cause local hot spots and perhaps local boiling of reactor cooling water if the same fuel density as exists in the standard pellet were used. A higher enrichment of the $UO_2$ kernel is needed because the fuel assembly is expected to remain in the operating reactor much longer, since its allowable burnup is at least doubled. The enrichment required for each new TRISO pellet may vary between three and five times that used in the LWR pellet the TRISO LWR pellet is replacing. The enrichment of a specific TRISO LWR fuel pellet, or series of pellets, is also a function of the need to control reactivity and power along the length of the fuel rod. As noted above, the TRISO LWR fuel pellet can remain in the reactor much longer because the TRISO type fuel retains its integrity much longer than the typical fuel cladding (zircaloy) would in the same burnup conditions.

By configuring the TRISO LWR fuel pellet with the same dimensions as the standard fuel pellet used in the LWR, the TRISO LWR pellets can be readily substituted for the LWR fuel pellets, including the stacking arrangement used within existing LWR fuel rods. Use of the same design fuel rod, except for containing the TRISO LWR fuel pellet, ensures that the same fuel assembly configuration is used.

The fuel rod configuration using TRISO LWR fuel pellets allows the existing plants to extend operations, since allowable burnup has been increased. Because the new fuel pellet is installed in the existing fuel rod configuration, a second layer of protection against the release of fission products is provided by the zircaloy cladding of the fuel rod and its sealed ends. With the TRISO particle and fuel tube cladding barriers, the potential for accident fission product release is substantially reduced.

The TRISO LWR fuel pellet can be modified to be used in either pressurized water or boiling water reactors (PWR and BWR, respectively), with the comparatively minor changes in pellet dimensions and enrichment without any change to the physical configuration of the reactor vessel or core internals.

The combination of higher enrichment and lower fuel density can extend the operating life of the fuel to achieve about twice the number of effective full power days and reduce the need for expensive plant shutdowns to reload fuel. TRISO type fuels have a proven capability for retaining fission products within the confinement boundary created by the coating material. This robustness is expected to reduce or eliminate fuel failures and the associated costs and risks. Use of the same LWR assembly configuration (external dimensions) allows use of the new TRISO fuel in operating plants. Thus an additional barrier against the release of radioactive materials to the public has been provided by the TRISO LWR fuel assembly.

There are no unique or specialized fabrication steps in the construction of the TRISO LWR fuel. Fabrication is easily performed by those skilled in the art. The TRISO coated microsphere fuel is fabricated using methods long established for the fuel type and no change in design or fabrication from standard practice is required; however, variations in maximum enrichment, including increased enrichment, of individual fuel microspheres is required as determined by analysis.

The TRISO LWR pellet may be formed by a physical and mechanical mixing of the TRISO fuel microspheres with a matrix material in a molten state, that when solidified, holds the TRISO fuel particles in fixed positions within the pellet. Alternatively, the TRISO LWR pellet may be formed using a powder metallurgy process that applies heat and pressure to a mixture of powdered matrix material and TRISO particle to mechanically form the pellet. TRISO fuel particles have very high compressive strength so that they remain intact during the hot pressing process.

Any process used to form the TRISO LWR fuel pellet must result in the essentially uniform distribution of TRISO fuel particles within the completed pellet and the finished mold shape must be that of a standard fuel pellet for LWR fuel that the TRISO LWR fuel pellet is intended to replace.

BRIEF DESCRIPTION OF THE DRAWINGS

Further advantages of the invention are apparent by reference to the detailed description, in conjunction with the figures, wherein elements are not to scale so as to more clearly show the details, wherein like reference numbers indicate like elements throughout the several views and wherein.

DETAILED DESCRIPTION OF THE INVENTION

Figure 1:
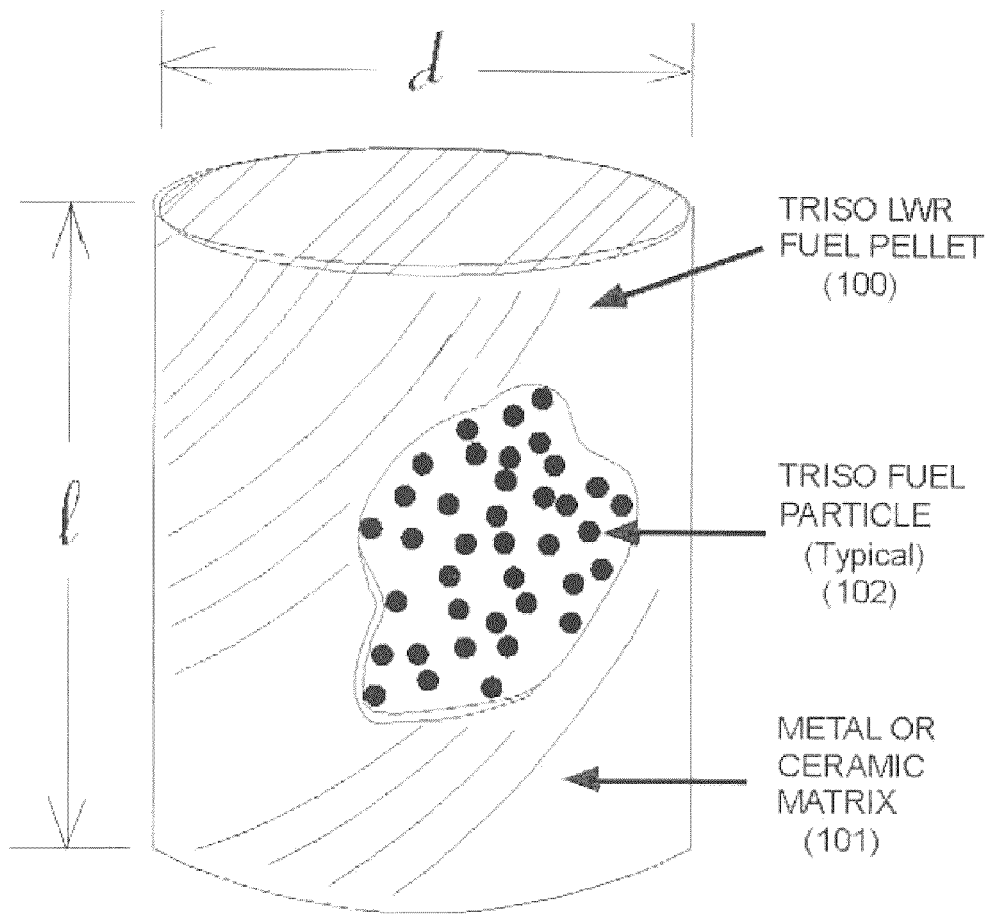
FIG. 1 depicts the cylindrical shape of the TRISO LWR Fuel Pellet and illustrates the dispersal of TRISO Microsphere Fuel Particles within a stabilizing metal, metal alloy or ceramic matrix.

FIG. 1 depicts the preferred embodiment of the TRISO based LWR fuel pellet. It consists of a fuel pellet (100) formed using an inert (non-fuel bearing) metal, metal alloy or ceramic matrix (101) binding thousands of TRISO microsphere particles (102) into a fuel pellet. The TRISO LWR fuel pellet (100) is a right circular cylinder which may have chamfered edges and a dished or concave surface at the top and/or bottom face. These geometric features allow for expansion of the TRISO fuel pellet as it heats up in the reactor core. The metal, metal alloy or ceramic binder (101) provides a heat transfer medium to remove heat from the pellet and also stabilizes the TRISO particles (102) within a matrix so that they cannot move. The matrix (101) may be made from metals other than zirconium, such as nickel, aluminum or zinc, but an alloy of zirconium is the preferred form. Fuel pellets are small in diameter, usually a quarter to a half inch, with a height of about one half (½) inch. The fuel pellet dimensions are sized to fit a particular nuclear reactor fuel rod design.

The TRISO particles (102) are formed using well established fabrication techniques and are essentially an "off the shelf" item except for the required level of enrichment. The small size of the TRISO particles (102) means that a single fuel pellet (100) will contain thousands of TRISO microsphere particles.

Figure 2:
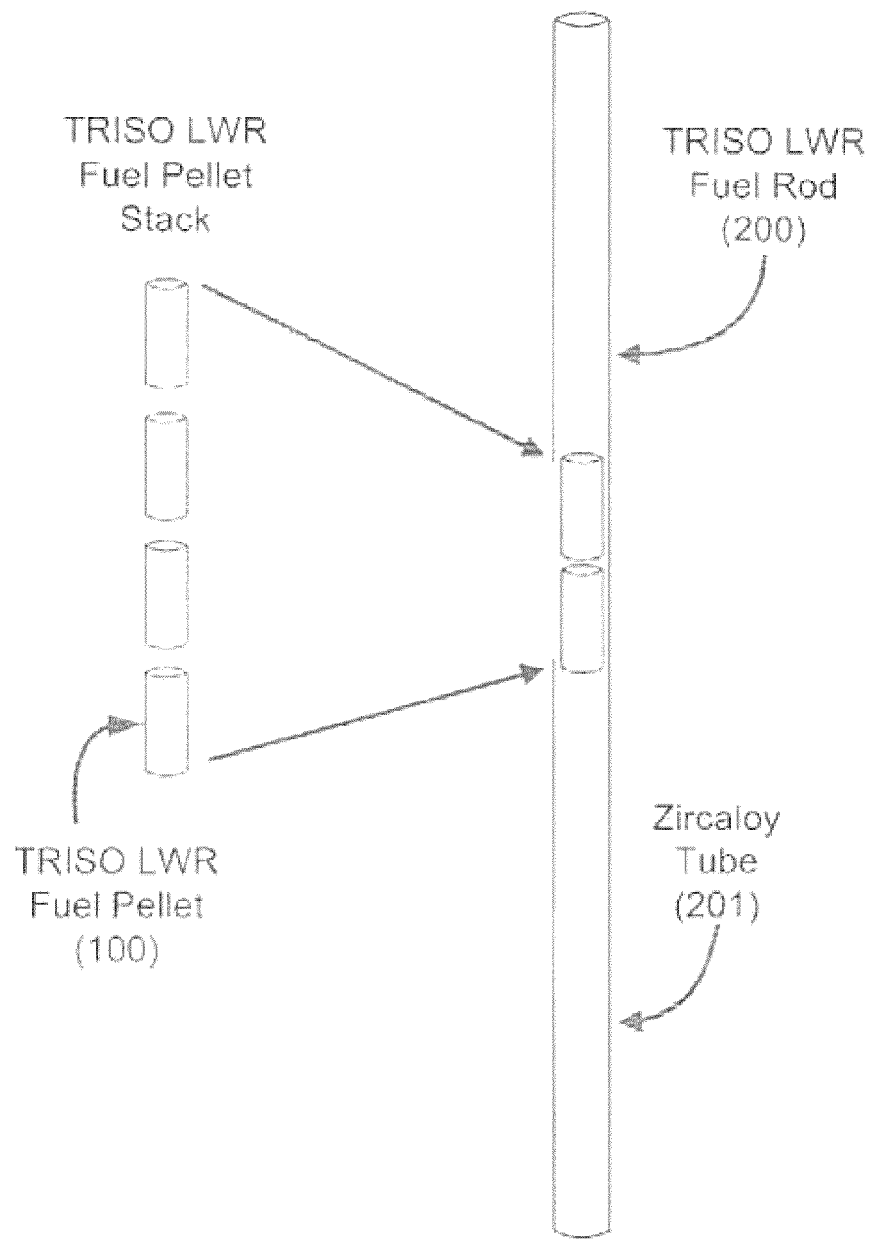
FIG. 2 depicts the vertical stacking of the TRISO LWR Fuel Pellets within a LWR Fuel Rod. Because the fuel rod would contain TRISO LWR Fuel Pellets it is referred to as a TRISO LWR fuel rod; however, the design, function and operation of the LWR fuel rod are well established.

The TRISO particle (102) is a multilayer sphere having layers of protecting material surrounding a central (fuel) kernel of enriched uranium. The kernel is typically uranium oxide or uranium carbide, having a variable enrichment determined by the anticipated use. The kernel is coated first with a layer of low density, porous, carbon used to cushion or buffer the stresses caused by irradiation in a nuclear reactor as the uranium is burned (or used). The inner carbon layer is further coated with a layer of pyrocarbon that is further coated with a layer of silicon carbide. These layers absorb fission products produced in the uranium fuel kernel during the nuclear fission process. An outer layer of silicon carbide provides containment of fission gasses and, because of its high structural integrity, precludes the release of the fuel and the fission products produced by the fission reaction in routine operation and most accident events. FIG. 2 depicts a fuel rod (200), within which the TRISO/LWR Fuel Pellets (100) are stacked. It consists typically of a zircaloy tube (201), which is closed by top and bottom plugs that are welded in place to close the fuel rod (200) after the fuel pellets (100) are stacked within the fuel rod. The fuel pellet stack is typically 12 feet in length, but the stack length may vary based on the requirements of a particular reactor. The wall of the zircaloy tube (201) is thin, typically about 0.03 inches thick. Helium gas is used to fill the interior voids of the fuel rod, providing an inert atmosphere. The zircaloy tube (201) of the fuel rod (200) provides structural support for the vertical fuel pellet stack and seals the fuel pellets (100) from the flow of water coolant through the reactor core. The fuel rods of the type described here are a standard and well documented configuration used in nuclear power plant fuel assembly arrangements for decades and no claim is made to the design of the fuel rod. The fuel rod is described for the purpose of aiding the understanding and operation of the invention and because the fuel rod presents and additional barrier to the release of fission product material in the unlikely event of failure of the TRISO LWR fuel pellets within the fuel rod.

A LWR fuel assembly is used to hold LWR fuel rods in a square array for use in the nuclear reactor. Fuel rods for a Pressurized Water Reactor (PWR) are typically arranged in square arrays of from 14 by 14 to 17 by 17 rods, while those for a Boiling Water Reactor (BWR) are typically arranged in square arrays of from 7 by 7 to 9 by 9 rods. No claim is made to the design of the fuel assembly.

The fabricated TRISO-LWR fuel assembly is expected to be identical in exterior appearance to the existing fuel design used in a given nuclear power plant. The difference is that within the fuel pellet the TRISO microspheres and matrix have replaced the traditional $UO_2$ material. The finished fuel assembly using TRISO LWR fuel pellets provides an additional, and substantial, level of containment of radioactive materials than is present in traditional LWR fuel designs, which rely solely upon the fuel rod zircaloy cladding for containment.

What is claimed is:

1. A method of forming a nuclear reactor fuel assembly with multiple LWR TRISO fuel pellets held within a LWR fuel rod, said fuel pellet having a density of approximately 5 gm/cm$^3$, said method comprising the step of forming a LWR TRISO fuel pellet consisting solely of low enriched TRISO uranium microsphere fuel having an enrichment in $U^{235}$ of above 5% uniformly and homogeneously distributed throughout a stable inert metal or metal alloy matrix, immobilizing said microspheres within said matrix, forming said LWR TRISO fuel pellets with overall dimensions substantially the same as those of the standard LWR uranium dioxide fuel pellets that said LWR TRISO fuel pellets are intended to replace by conforming the height and outer diameter of said fuel pellets to the height and outer diameter of the uranium dioxide fuel pellets, combining fuel rods containing only said LWR TRISO fuel pellets into an array forming the LWR fuel assembly and excluding non-TRISO fuel rods containing conventional uranium dioxide, said kernel being coated with silicon carbide, the nuclear fuel kernel of the LWR TRISO microsphere being low enriched uranium or its oxides, and said density value being a nonhomogenous volumetric average of the density of said uranium kernel, said spherical coating and said matrix.

2. A method according to claim 1 wherein the matrix material may be a metal such as zirconium, aluminum, nickel and alloys thereof compatible with TRISO microsphere fuel.

3. A method according to claim 1 wherein said fuel rods are used in any fuel rod position of the fuel assembly.

* * * * *